(12) United States Patent
Nakajima

(10) Patent No.: US 8,059,187 B2
(45) Date of Patent: Nov. 15, 2011

(54) IMAGE CAPTURING APPARATUS

(75) Inventor: Kenichi Nakajima, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 477 days.

(21) Appl. No.: 12/132,634

(22) Filed: Jun. 4, 2008

(65) Prior Publication Data

US 2009/0167932 A1    Jul. 2, 2009

(30) Foreign Application Priority Data

Dec. 27, 2007  (JP) ................................ 2007-335468
Apr. 1, 2008   (JP) .................................. 2008-95220

(51) Int. Cl.
  *H04N 5/235* (2006.01)
  *H04N 5/238* (2006.01)
  *H04N 5/222* (2006.01)
  *G06K 9/40* (2006.01)

(52) U.S. Cl. ........ 348/362; 348/364; 348/366; 348/371; 382/254

(58) Field of Classification Search ................ 348/362, 348/364, 366, 371; 386/46; 382/254
See application file for complete search history.

(56) References Cited

U.S. PATENT DOCUMENTS

| | | | |
|---|---|---|---|
| 2003/0179398 A1* | 9/2003 | Takano et al. | 358/1.9 |
| 2005/0123211 A1* | 6/2005 | Wong et al. | 382/254 |
| 2006/0082676 A1* | 4/2006 | Jenkins et al. | 348/362 |
| 2006/0262333 A1* | 11/2006 | Jenkins | 358/1.12 |
| 2006/0274180 A1* | 12/2006 | Yasuda | 348/333.01 |
| 2007/0013782 A1* | 1/2007 | Kobayashi | 348/207.99 |
| 2007/0070214 A1* | 3/2007 | Nakamura | 348/222.1 |
| 2007/0177050 A1* | 8/2007 | Xiao et al. | 348/371 |
| 2007/0297753 A1* | 12/2007 | Usui et al. | 386/46 |

FOREIGN PATENT DOCUMENTS

| | | |
|---|---|---|
| JP | 2007-027967 | 2/2007 |
| JP | 2007-121654 | 5/2007 |

OTHER PUBLICATIONS

"Comparison of Retinex Models for Hardware Implementation" by Nosato et al., IEICE Technical Report, SIS, 2005-16, pp. 19-24, (Jun. 2005).

* cited by examiner

*Primary Examiner* — David Ometz
*Assistant Examiner* — Quang Le
(74) *Attorney, Agent, or Firm* — Peter P. Hernandez; Peyton C. Watkins

(57) ABSTRACT

Appropriate gray level processing is applied to various image data. A digital camera having a grayscale correction function is provided. An AE control section generates a brightness histogram of a preview image which is obtained by a CCD. An exposure correction amount calculation section, based on the brightness histogram which is generated, sets an exposure value which is under an appropriate exposure value in consideration of grayscale correction to be performed by a grayscale correction section. The grayscale correction section applies grayscale correction to each partial region of image data of an image which is captured. The exposure correction amount calculation section varies the exposure value between when a face is included in a subject and when a face is not included in the subject.

8 Claims, 4 Drawing Sheets

| CONDITION | FACE INCLUDED | FACE NOT INCLUDED |
|---|---|---|
| OEV CONDITION | ...... | ...... |
| $-\Delta_1$ EV CONDITION | ...... | ...... |
| $-\Delta_2$ EV CONDITION | $x_3$EV OR GREATER IN 60% OR MORE AND FACE AREA WITH $y_1$EV OR GREATER | $x_3$EV OR GREATER IN 50% OR MORE |
| $-\Delta_3$ EV CONDITION | $x_4$EV OR GREATER IN 25% OR MORE AND $x_5$EV OR GREATER NOT PRESENT AND $x_2$EV OR SMALLER IN 10% OR LESS AND FACE AREA $y_2$EV OR GREATER AND $y_3$EV OR SMALLER | $x_4$EV OR GREATER IN 25% OR MORE AND $x_5$EV OR GREATER NOT PRESENT AND $x_2$EV OR SMALLER IN 10% OR LESS |
| $-\Delta_4$ EV CONDITION | ...... | $x_4$EV OR GREATER IN 20% OR MORE AND $x_5$EV OR GREATER PRESENT AND $x_1$EV OR SMALLER IN 10% OR LESS OR $x_0$EV OR SMALLER IN 20% OR MORE |

*FIG. 4*

IMAGE CAPTURING APPARATUS

CROSS REFERENCE TO RELATED APPLICATIONS

This application claims priority to Japanese Patent Applications No. 2007-335468 filed on Dec. 27, 2007 and No. 2008-095220 filed on Apr. 1, 2008, which are incorporated herein by reference in its entirety.

FIELD OF THE INVENTION

The present invention relates to an image capturing apparatus, and more particularly to grayscale correction.

BACKGROUND OF THE INVENTION

Grayscale correction for correcting brightness and contrast in an image which is captured under an illumination condition such as a condition that a subject is photographed against the light is known, and gamma correction and histogram correction are typical examples of the grayscale correction. With gamma correction and histogram correction, however, as image correction is performed using a fixed coefficient, problems of an image being white by overexposure and an image being black by underexposure arise.

On the other hand, adaptive grayscale correction (adaptive enhancement) in which, in addition to the gray level value of image data, information concerning pixels adjacent to a pixel to be corrected is used to determine correction coefficients has been proposed, and with this technology, correction in accordance with the content of an image can be achieved. The adaptive grayscale correction is disclosed in "Comparison of Retinex Models for Hardware Implementation" by Nosato et al., IEICE technical report, SIS, 2005-16, pp. 19-24 (June, 2005). The adaptive grayscale correction is based on Retinex theory, in which assuming that an input image is represented by a product of illumination light and reflectivity, illumination light is separated from an input image to thereby obtain a reflectivity image as a correction image. Provided that an input image I is represented as an input image I=illumination light L× reflectivity R (correction image), the relationship of $R(x, y) = \exp\{\log(I(x,y)) - \log(L(x,y))\}$ can be achieved. Calculus of variation is used to estimate the illumination light, and a plurality of layers k with a resolution which is $1/2^k$ that of the original image are generated and calculation for updating the illumination light is repeated starting from a layer with a lower resolution. Here, the calculation for updating the illumination light is performed by using the expression of $L(x, y) = L x, y) - \mu NSD \times G(x, y)$, wherein $G(x, y)$ is a gradient of cost function and $\mu NSD$ is learning coefficient. Specifically, a processing, in which $G(x, y)$ is first calculated, and $\mu NSD(x, y)$ is then calculated, and based on these calculation results, $L(x, y)$ is calculated, is repeated.

Further, JP2007-27967A discloses that, when a person photographing mode is selected, an image is captured with the exposure value being set to a value under an appropriate exposure value computed by an AE (Automatic Exposure) detector, and grayscale correction is applied to image data obtained by image capturing by using a γ transform table for increasing the dynamic range of image data which has been subjected to gray level conversion processing, thereby correcting the brightness value of portions of the image with insufficient brightness which are located in the vicinity of the center of the subject.

As described above, problems of an image being white by overexposure and an image being black by underexposure can be prevented by photographing a subject with the exposure value being set under the appropriate exposure value which is set by AE and then adaptively performing grayscale correction with respect to the resulting image data. However, this method, in which the exposure value which is under the appropriate value (hereinafter referred to as an "underexposure value") is fixed, cannot be applied to various types of images and therefore suffers from a disadvantage that an image desired by a user cannot be obtained.

SUMMARY OF THE INVENTION

The present invention advantageously provides an image capturing apparatus which can obtain an image desired by a user by performing adaptive grayscale correction with respect to image data of an image which is captured with an exposure value being set in consideration of an exposure correction value in accordance with a photographic condition with respect to an appropriate exposure value obtained by AE.

In accordance with an aspect of the present invention, there is provided an image capturing apparatus for capturing an image of a subject, comprising: exposure control means which calculates an appropriate exposure value; image correction means which applies grayscale correction to image data of an image which is captured with an exposure value being set under or over the appropriate exposure value; and adjustment means which adjusts the exposure value by determining whether or not a brightness histogram of the image data before application of grayscale correction by the correction means satisfies a predetermined condition.

In accordance with another aspect of the present invention, the adjustment means provides data concerning adjustment to the image correction means, and the image correction means adjusts a correction amount based on the data concerning adjustment.

In accordance with still another aspect of the present invention, the adjustment means makes the determination with the predetermined condition being varied between when a face is included in the subject and when a face is not included in the subject.

In accordance with a further aspect of the present invention, the adjustment means adjusts the exposure value which is set under the appropriate exposure value by further determining whether or not the brightness of the subject is at a brightness level which requires emission of strobe light, whether or not the subject is a specific scene, whether or not an ISO value is a threshold value or greater, or whether or not a person's face is included in the subject.

According to the present invention, adaptive grayscale correction is performed with respect to image data of an image which is captured with an exposure value being set in consideration of an exposure correction value in accordance with a photographic condition with respect to an appropriate exposure value obtained by AE, so that an image desired by a user can be obtained.

BRIEF DESCRIPTION OF THE DRAWINGS

A preferred embodiment of the present invention will be described in detail based on the following figures, wherein:

FIG. 4 is a table chart showing a relationship between a brightness histogram and an exposure correction amount according to the embodiment of the present invention.

DETAILED DESCRIPTION OF THE INVENTION

A preferred embodiment of the present invention will be described in detail with reference to the accompanying drawings.

A preferred embodiment of the present invention, in which a digital camera is provided as an image capturing apparatus as an example, will be described in detail with reference to the accompanying drawings.

Figure 1:
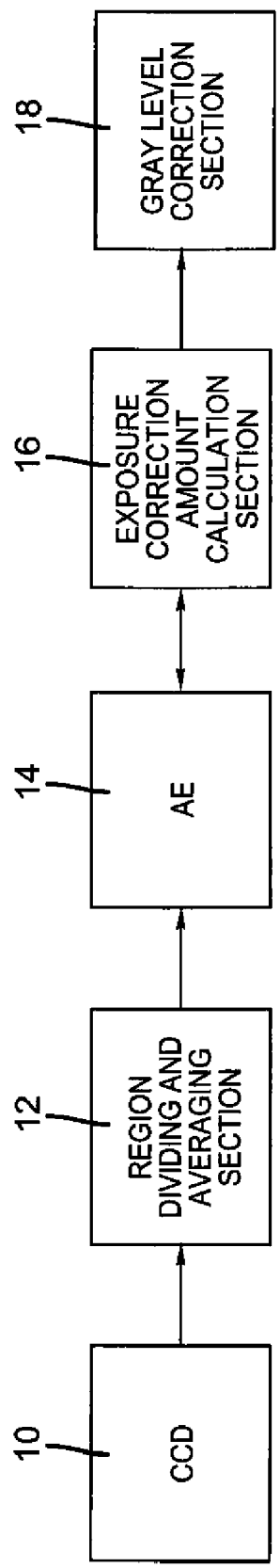
FIG. 1 is a block diagram showing functions of an embodiment of the present invention.

FIG. 1 is a block diagram showing functions of a digital camera according to an embodiment of the present invention. In the present embodiment, structures of optics for forming an image of a subject on an image capturing element, a means which performs correlated double sampling with respect to an image signal supplied from the image capturing element and a means which converts the image signal into a digital signal, a means which compresses or extends image data, a means which generates a preview image, a means which displays the preview image and a captured image on a display device, a means which records the image data on a recording medium, an auto focus (AF) means, a white balance (WB) processing means, and so on, are the same as those of known digital cameras, and will not therefore be described.

Referring to FIG. 1, a CCD 10, serving as an image capturing element, outputs R, G, and B image signals. It should be noted that the image capturing element is not limited to a CCD, and may be a CMOS.

A region dividing and averaging section 12 divides image data obtained by the CCD 10, more specifically, preview image data, into a plurality of regions or blocks, and calculates and outputs an average pixel value for each region. More specifically, the region dividing and averaging section 12 divides the whole image data into n×m rectangular regions and calculates a simple average of R, G, and B pixel values for each region.

An AE control section 14 performs exposure assessment for preview based on the preview image data to calculate an appropriate exposure value. The preview exposure assessment can be achieved either by a method of measuring light intensively on the center portion of the image or a multipoint light measurement method. If the multipoint light measurement method is adopted for the exposure assessment, the result can be used for exposure assessment for photographing. In addition, the AE control section 14 generates a brightness histogram by using the image data of preview image, and provides the brightness histogram to an exposure correction amount calculation section 16.

The exposure correction amount calculation section 16 calculates an exposure correction amount with respect to the appropriate exposure based on determination of whether or not the brightness histogram satisfies a specific condition, and supplies the exposure correction amount to the AE control section 14 and a grayscale correction section 18. Here, the exposure correction amount calculation section 16 calculates the exposure correction amount on the assumption that the image data of a captured image is to be subjected to grayscale correction by the grayscale correction section 18. In the present embodiment, the exposure correction amount is set in six levels with respect to the appropriate exposure value. More specifically, the exposure correction amount $\Delta EV$ is set to one of 0 EV, $-\Delta 1$ EV, $-\Delta 2$ EV, $-\Delta 3$ EV, $-\Delta 4$ EV, and $+\Delta 5$ EV. Here, the positive sign attached to the exposure correction amount indicates overexposure with respect to the appropriate exposure value, and the negative sign attached to the exposure correction amount indicates underexposure with respect to the appropriate exposure value. Also, the relationship of $\Delta 1 < \Delta 2 < \Delta 3 < \Delta 4$ is satisfied.

The grayscale correction section 18 applies adaptive grayscale correction to the image data of an image captured with exposure correction, based on the exposure correction amount obtained from the exposure correction amount calculation section 16 and the appropriate exposure value (a reference of exposure). Here, arbitrary gray level correction grayscale correction methods may be employed for applying γ transform to the brightness data by using an adaptive γ function and also correcting the color difference data, thereby performing grayscale correction. As the grayscale correction section 18 performs grayscale correction such that exposure of the image data captured with underexposure is compensated for, to thereby achieve the appropriate exposure, a correction amount for the grayscale correction is decreased when the exposure correction amount is small, whereas the correction amount for the grayscale correction is increased when the exposure correction amount is large. In the latter case, effects of the grayscale correction appear in a noticeable manner (i.e. distortion due to the grayscale correction appears in a noticeable manner). The exposure correction amount calculation section 16 in FIG. 1 is specifically formed by a CPU. The grayscale correction section 18 is formed of a dedicated DSP.

Figure 2:
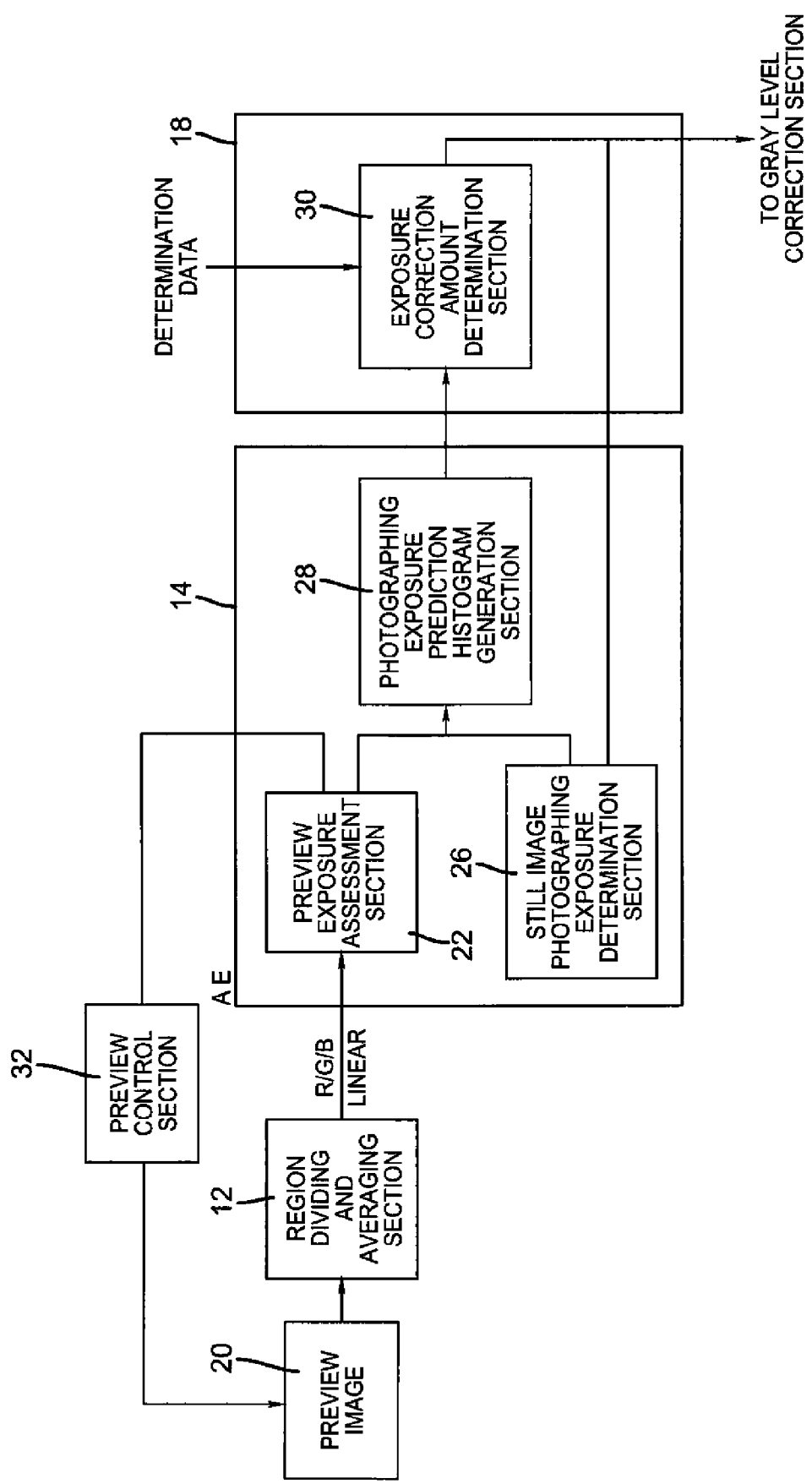
FIG. 2 is a block diagram showing detailed functions of the embodiment of the present invention.

FIG. 2 is a block diagram showing the functions of the AE control section 14 and the exposure correction amount calculation section 16 in FIG. 1 in more detail. The preview image 20 generated by processing the image signals obtained by the CCD 10 is provided to the region dividing and averaging section 12. The region dividing and averaging section 12 generates data for AE assessment, by dividing the preview image into 12×8 blocks and calculating the average value of the R, G, and B signals for each block, for example.

A preview exposure assessment section 22 of the AE control section 14 calculates an assessment value for controlling the exposure of the preview image. The assessment value thus calculated is supplied to a preview exposure control section 32 and controlled to an appropriate exposure value. A photographing exposure prediction histogram generation section 28, based on the data supplied from the preview exposure assessment section 22, generates a brightness histogram which is expected to be obtained from image data of an image which is to be captured with a current exposure value. More specifically, the photographing exposure prediction histogram generation section 28 converts the average value of the R, G, and B color values for each block into brightness Y and converts the brightness Y in EV units using log2 (brightness Y/appropriate exposure value). After calculation of brightness Y in EV unit for each block is completed, the calculated data items corresponding to the number of blocks (12×8=96) are used to generate a histogram. Here, the horizontal axis of the histogram is made to indicate a deviation amount with respect to the appropriate exposure (153). The histogram thus calculated is provided to the exposure correction amount calculation section 16.

An exposure correction amount determination section 30 of the exposure correction amount calculation section 16 determines an exposure correction amount based on the histogram and other determination data including data for determining whether or not flash is ON, whether or not the preview image data is present, data concerning a person's face (presence or absence, position, size, and so on), and other data. The exposure correction amount is determined in such a manner that when, in the histogram described above, values (the deviation amounts) of x4 EV or greater are present in 25% or more of the whole values, values of x5 EV or greater are not present, and also values of x2 EV or less are present in 10% or less of the whole values, the exposure correction amount is set to $-\Delta 3$, for example. A specific method of determining the exposure correction amount based on the histogram will be described below. The exposure correction amount thus determined is supplied to the grayscale correction section 18 and to a still image photographing exposure determination section 26 of the AE control section 22. The still image photographing exposure determination section 26 determines the exposure value at the time of photographing, based on an assessment result from a still image capturing exposure assessment section 24 and the exposure correction amount.

Figure 3:
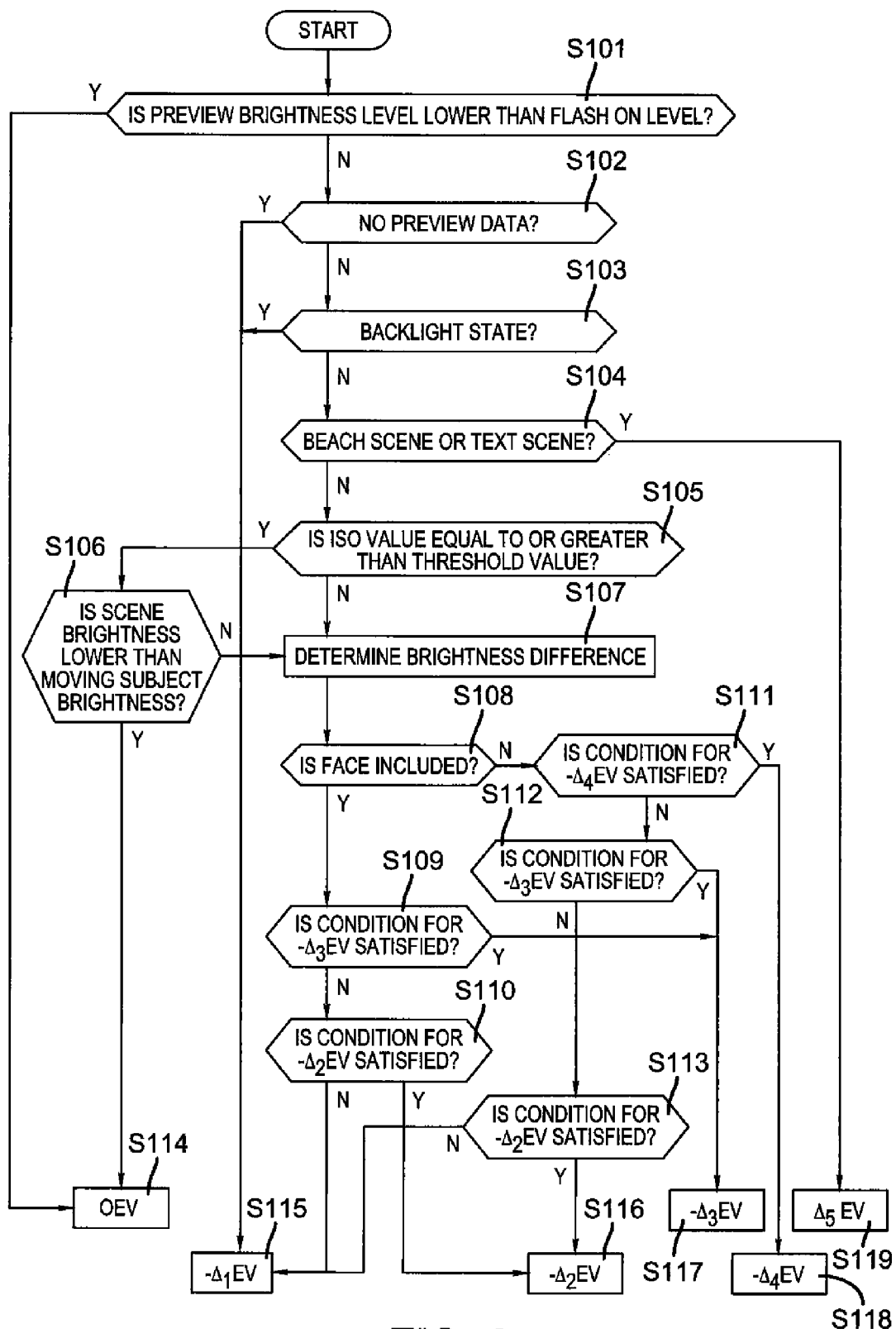
FIG. 3 is a flowchart showing processing of the embodiment of the present invention.

FIG. 3 is a flowchart showing a processing according to the present embodiment. First, the CPU of the digital camera determines whether or not the brightness level of the preview image is lower than a level at which a strobe light (flash) need to be ON (S101). As the photographic scene itself is dark if the flash need to be fired, this determination is made so as to prevent a further underexposure state. Accordingly, if the brightness level is lower than the flash ON level, the exposure correction amount $\Delta EV$ with respect to the approximate exposure value is set to 0. Specifically, in this case, the appropriate exposure value is maintained (S114).

If the brightness level of the preview image is equal to or higher than the level at which flash should be ON, on the other hand, it is then determined whether or not the preview image data is not present (S102). The preview image data does not exist immediately after power is ON or immediately after recovery from the reproduction mode to the photographing mode. When a user presses a shutter button completely with a single press in such a state, exposure correction cannot be performed due to the absence of the preview image data. Accordingly, when there is no preview image data, higher priority is given to photographing than to exposure correction, and the exposure correction amount calculation section 16 sets the exposure correction amount to a default underexposure value (S115). Specifically, the exposure correction amount calculation section 16 sets the exposure value to be under the appropriate exposure value by the exposure correction amount $\Delta EV = -\Delta 1$ EV.

If the preview image is present, it is then determined whether or not the backlight condition is present (S103). If the backlight condition is determined, in which case flash is to be forcedly fired, the exposure correction amount calculation section 16 sets the exposure correction amount to the default underexposure value (S115). Specifically, the exposure correction amount calculation section 16 sets the exposure value to be under the appropriate exposure value by the exposure correction amount $\Delta EV = -\Delta 1$ EV.

If the backlight condition is not determined, it is then determined whether or not the photographic scene is a specific scene, and more specifically, whether or not the photographic scene is a scene of the beach or a scene in which a text (document) is photographed (S104). This determination is made because, there are cases in which, when the photographic scene is one of these scenes, the scene is photographed more preferably with overexposure than with underexposure. Accordingly, if the photographic scene is determined to be one of these scenes, the exposure correction amount calculation section 16 sets the exposure correction amount to be over the appropriate exposure value (S119). Specifically, the exposure correction amount calculation section 16 sets the exposure value to be over the appropriate exposure value by the exposure correction amount $\Delta EV = +\Delta 5$ EV. Here, the determination as to whether or not the photographic scene is a beach scene or a text photographing scene can be performed by using known scene discrimination technologies. JP 2007-121654 A, for example, discloses a technology for discriminating a scene based on a combination of the temperature characteristics, and movement, hue, chroma, brightness, and so on of an image detected by an image characteristics extraction circuit.

If the photographic scene is not the specific scene, it is then determined whether or not ISO is equal to or greater than a threshold value (S105). When the photographic scene is dark, the shutter speed is fixed so as to prevent the camera from shaking and the ISO is increased to increase the sensitivity. However, high ISO would result in an increase in noise. Accordingly, the above determination concerning ISO is made so as to prevent exposure correction when the ISO is equal to or greater than a threshold value. As such, if the ISO is equal to or greater than a threshold value, the exposure correction amount calculation section 16 basically determines the exposure correction amount such that the appropriate exposure is maintained. Here, high ISO is determined in the following two cases: (1) a case in which a photographic scene itself is dark; and (2) a case in which, although a photographic scene is not dark, the ISO is increased to compensate for the insufficient light, when a high-speed shutter operation is employed so as to photograph a moving subject when the subject stops moving. The exposure correction amount calculation section 16 does not execute exposure correction for the case (1) of the above two cases, and executes exposure correction for the case (2). It is therefore determined whether or not the brightness of a photographic scene is lower than the brightness for a moving subject (S106), and if the brightness of the photographic scene is lower than the brightness for the moving subject, the exposure correction amount calculation section 16 determines the exposure correction amount to remain the appropriate exposure amount, i.e. $\Delta EV = 0$ (S115). Here, the threshold values of EV values for use in determination represent values on the horizontal axis of the histogram, in which the relationships of $x0 < x1 < x2 < x3 < x4 < x5$ and $y1 < y2 < y3$ are satisfied.

If the ISO is less than the threshold value, or if the above condition (2) is satisfied even though the ISO is equal to or greater than the threshold value, a brightness difference is determined by using a histogram (S107). Then, sequential determination is made as to whether or not the brightness difference satisfies a specific condition, and the exposure correction amount is set in accordance with the determination results.

Specifically, it is first determined whether or not a photographic scene includes a person's face (S108). Technologies for detecting a person's face are also known, in which a portion of image data having a skin color is extracted, a matching degree between a person's face template and the image portion having a skin color is obtained, and an image portion with a high matching degree is determined as a candidate for a facial part, for example. In addition, an image portion corresponding to the eyes in the candidate facial portion may be further extracted to determine a person's face.

If it is determined that a person's face is included, it is then determined whether or not the brightness histogram satisfies a condition corresponding to the exposure correction amount $\Delta EV = -\Delta 3$ EV (S109). Specifically, the condition for setting $\Delta EV = -\Delta 3$ EV is as follows:

<condition for setting $-\Delta 3$ EV: face included>

The histogram includes values (deviation amounts) of x4 EV or greater in 20% or more, no values of x5 EV or greater, values of x2 EV or less in 10% or less, and a face area with y2 EV or greater and y3 EV or less.

If the above condition for $-\Delta 3$ EV is not satisfied, it is then determined whether or not the brightness histogram satisfies a condition corresponding to the exposure correction amount $\Delta EV=-\Delta 2$ EV (S110). Specifically, the condition for setting $\Delta EV=-\Delta 2$ EV is as follows:

<condition for setting $-\Delta 2$ EV: face included>

The histogram includes values of x3 EV or greater in 60% or more, and a face area with y1 EV or greater.

If the brightness histogram satisfies neither conditions, the exposure correction amount calculation section 16 sets the exposure correction amount $\Delta EV$ to a default value of $-\Delta 1$ EV (S115). If the brightness histogram satisfies the conditions for $-\Delta 2$ EV, the exposure correction amount calculation section 16 sets the exposure correction amount $\Delta EV$ to a value of $-\Delta 2$ EV (S116). This would result in that a scene would be photographed with the exposure value being set to a value which is further under or below the default underexposure value. Further, if the brightness histogram satisfies the conditions for $-\Delta 3$ EV, the exposure correction amount calculation section 16 sets the exposure correction amount $\Delta EV$ to a value of $-\Delta 3$ EV (S117). This would result in that a scene would be photographed with the exposure value being set to a value which is still further under or below the default underexposure value. On the other hand, if the photographic scene does not include a person's face, determination as to whether or not the brightness histogram satisfies a condition corresponding to $-\Delta 4$ EV (S111), as to whether or not the brightness histogram satisfies a condition corresponding to $-\Delta 3$ EV (S112), and as to whether or not the brightness histogram satisfies a condition corresponding to $-\Delta 2$ EV (S113) is sequentially performed. The conditions for setting the above exposure correction amounts are as follows:

<condition for setting $-\Delta 4$ EV: face not included>

The histogram includes values of x4 EV or greater in 20% or more, values of x5 EV or greater, and values of x1 or less in 10% or less, or values of x0 EV or less in 20% or more.

<condition for setting $-\Delta 3$ EV: face not included>

The histogram includes values of x4 EV or greater in 25% or more, no values of x5 EV or greater, and values of x2 EV or smaller in 10% or less.

<condition for setting $-\Delta 2$ EV: face not included>

The histogram includes values of x3 EV or greater in 50% or more.

All the conditions described above are shown in FIG. 4. Here, the determination criteria vary depending on the presence or absence of a person's face in the scene in order to make the correction amount in the grayscale correction relatively smaller when a person's face is included than when a person's face is not included. More specifically, the exposure correction amount $\Delta EV$ which is calculated in the exposure correction amount calculation section 16 is used for exposure control at the time of photographing and is also supplied to the grayscale correction section 18 for use in adjustment of the correction amount at the time of grayscale correction. As the grayscale correction section 18 applies grayscale correction to image data of an image captured with the exposure value being set under the appropriate exposure value to correct the underexposure value to the appropriate exposure amount, the correction amount at the time of grayscale correction decreases with the decrease in the underexposure value. As such, adjustment of the exposure correction amount simultaneously means adjustment of the correction amount in the grayscale correction performed by the grayscale correction section 18. Further, as shown in FIG. 4, the exposure correction amount $\Delta EV$ is set smaller when a person's face is included in a photographic scene than when a person's face is not included. It should be noted that, in FIG. 4, the maximum underexposure value when a person's face is included is an exposure correction amount $\Delta EV=-\Delta 3$ EV, whereas the maximum underexposure value when a person's face is not included is an exposure correction amount $\Delta EV=-\Delta 4$ EV. The underexposure value is set smaller when a person's face is included because, with the exposure value being set under the appropriate exposure value, noises are likely to be mixed accordingly, and therefore it is desirable to set the underexposure value to be a smaller value to thereby prevent noises from being mixed in the facial portion.

As described above, according to the present embodiment, as an image is captured with the exposure correction amount being dynamically adjusted based on the brightness histogram of a preview image and also grayscale correction is performed with respect to the image data obtained by image capturing, it is possible to deal with a variety of photographic scenes compared to when an image is captured with a fixed underexposure value and grayscale correction is then applied to the captured image. Here, it should be noted that the exposure correction amount in the present embodiment is set on the assumption that adaptive grayscale correction is to be performed in the subsequent processing, and therefore the exposure correction amount functions as a parameter for adjusting the correction amount for adaptive grayscale correction, rather than an exposure value which is simply set based on the brightness diagram.

While the preferred embodiment of the present invention has been described using specific terms, such description is for illustrative purposes only, and it is to be understood that changes and variations may be made without departing from the spirit or scope of the appended claims.

PARTS LIST

10 CCD
12 averaging section
14 control section
16 calculation section
18 correction section
20 preview image
22 assessment section
26 determination section
28 generation section
30 determination section
32 exposure control section

What is claimed is:

1. An image capturing apparatus for capturing an image of a subject, comprising:
    an image capture element that captures a preview image;
    exposure control section which calculates an appropriate exposure value from a preview image;
    histogram generation section that calculates a histogram from the preview image;
    exposure shift section that determines an exposure shift amount based on the result of the histogram generation section;
    wherein the image capture element captures image data with an exposure value shifted from the appropriate exposure amount by the exposure shift amount;
    image correction section which applies grayscale correction to image data captured by the image capture element having the shifted exposure;
    adjustment means provides data concerning adjustment to the exposure shift section, and
    the image correction section adjusts a correction amount based on the data concerning adjustment;

wherein the adjustment means makes a determination with a predetermined condition being varied between when a face is included in the subject and when a face is not included in the subject.

2. The image capturing apparatus according to claim 1, wherein
the adjustment means sets a maximum value of the exposure value which is set under the appropriate exposure value when a face is included in the subject to be smaller than a maximum value of the exposure value which is set under the appropriate exposure value when a face is not included in the subject.

3. The image capturing apparatus according to claim 1, wherein
the adjustment means adjusts the exposure value which is set under the appropriate exposure value, based on at least one of a ratio of pixels with high brightness and a ratio of pixels with low brightness in the brightness histogram with respect to the appropriate exposure value.

4. The image capturing apparatus according to claim 1, wherein
the adjustment means adjusts the exposure value which is set under the appropriate exposure value by further determining whether or not the brightness of the subject is at a brightness level which requires emission of a strobe light.

5. The image capturing apparatus according to claim 1, wherein
the adjustment means adjusts the exposure value which is set under the appropriate exposure value by further determining whether or not the subject is a specific scene.

6. The image capturing apparatus according to claim 1, wherein
the adjustment means adjusts the exposure value which is set under the appropriate exposure value by further determining whether or not an ISO value is a threshold value or greater.

7. The image capturing apparatus according to claim 1, wherein
the adjustment means adjusts the exposure value which is set under the appropriate exposure value by further determining whether or not a person's face is included in the subject.

8. The image capturing apparatus according to claim 1, wherein the image correction section adjusts a correction amount based on the result of the histogram generation section.

* * * * *